United States Patent
Farrokhi

(10) Patent No.: US 10,177,813 B1
(45) Date of Patent: Jan. 8, 2019

(54) SYNCHRONIZED SLOTTED POWER LINE COMMUNICATION

(71) Applicant: Farrokh Farrokhi, San Ramon, CA (US)

(72) Inventor: Farrokh Farrokhi, San Ramon, CA (US)

(73) Assignee: SEMTECH CORPORATION, Camarillo, CA (US)

( * ) Notice: Subject to any disclaimer, the term of this patent is extended or adjusted under 35 U.S.C. 154(b) by 0 days.

(21) Appl. No.: 15/657,090

(22) Filed: Jul. 21, 2017

(51) Int. Cl.
*H04B 3/54* (2006.01)
*H04J 3/06* (2006.01)

(52) U.S. Cl.
CPC .............. *H04B 3/54* (2013.01); *H04J 3/0638* (2013.01)

(58) Field of Classification Search
CPC .... H04B 3/54; H04B 3/542; H04B 2203/542; H04B 3/32; H04B 2203/5412; H04B 2203/547; H04B 15/00; H04B 2203/5425; H02J 13/002; H02J 13/0024; H02J 3/00; H02J 3/01; G01R 27/16; G01R 19/175; H03M 1/1095; H04L 5/0007; H04L 27/2655; H04L 27/2656; H04L 27/2663; H04L 27/2662
See application file for complete search history.

(56) References Cited

U.S. PATENT DOCUMENTS

| | | | |
|---|---|---|---|
| 9,749,012 B2* | 8/2017 | Farrokhi | H04B 3/54 |
| 2006/0268790 A1* | 11/2006 | Kuroda | H04B 3/542 370/335 |
| 2010/0183029 A1* | 7/2010 | Yoshizawa | H04B 3/54 370/470 |
| 2011/0200058 A1* | 8/2011 | Mushkin | H04L 5/0046 370/475 |
| 2012/0201155 A1* | 8/2012 | Du | H04B 3/54 370/252 |
| 2013/0322554 A1* | 12/2013 | Vijayasankar | H04B 3/54 375/257 |
| 2016/0352388 A1* | 12/2016 | Lane | H04B 3/54 |
| 2017/0230081 A1* | 8/2017 | Kim | H04B 3/54 |
| 2017/0331515 A1* | 11/2017 | Colonques | H04M 3/34 |

* cited by examiner

*Primary Examiner* — Khanh C Tran
(74) *Attorney, Agent, or Firm* — Farjam Majd

(57) ABSTRACT

A method and a device are disclosed including a PLC node having a synchronizer, a modem with a transceiver, and a computing device coupled with a power line for power line data communications. In various embodiments, a coordinator or Data Concentrator Unit (DCU) coordinates the communication of PLC nodes. The PLC nodes are configured to detect a zero crossing of the power line wave form and transmit or receive data within time slots defined with respect to the detected zero crossing. In other embodiments, the time slots may be synchronized using a frame sync signal, an external signal, or polling. In various embodiments, the time slots may be random access or assigned. In some embodiments, the modem and/or node may be placed in a sleep mode when not communicating to reduce power consumption and be awaken when an allocated time slot is approaching.

10 Claims, 13 Drawing Sheets

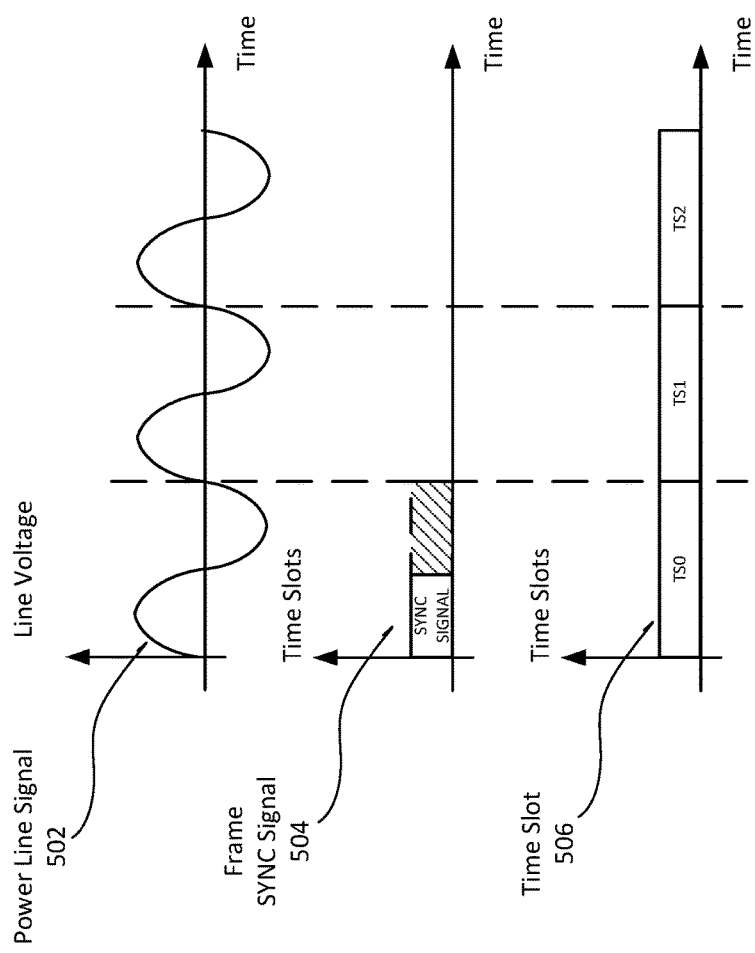

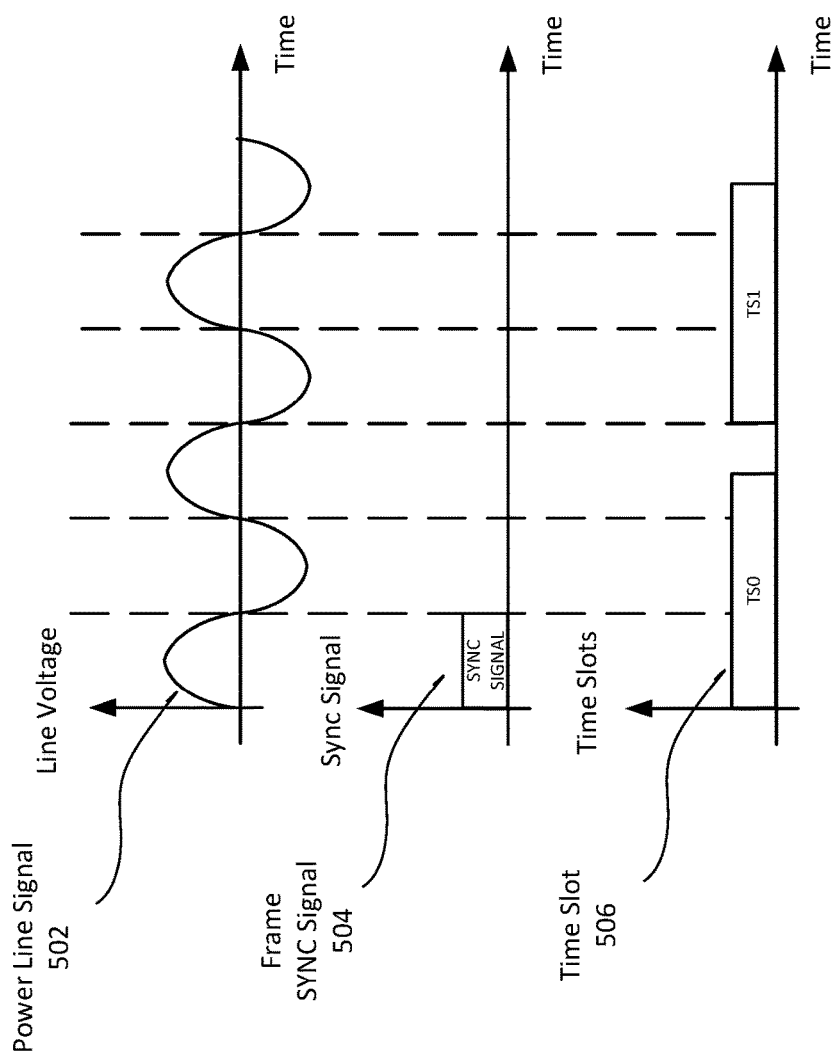

SYNCHRONIZED SLOTTED POWER LINE COMMUNICATION

CROSS-REFERENCE(S) TO RELATED APPLICATION(S)

The present application is a Divisional of, and claims the benefit of the filing date of U.S. application Ser. No. 14/214,095, filed on 14 Mar. 2014, entitled "SYNCHRONIZED SLOTTED POWER LINE COMMUNICATION," the contents of which are hereby expressly incorporated by reference in their entirety, under 35 U.S.C. § 120.

TECHNICAL FIELD

This application relates generally communications. More specifically, this application relates to efficient Power Line Communications (PLC) by synchronizing with specific waveform points of a power transmission waveform.

BRIEF DESCRIPTION OF THE DRAWINGS

The drawings, when considered in connection with the following description, are presented for the purpose of facilitating an understanding of the subject matter sought to be protected.

FIGS. 5A-5C show various example timing diagrams for various synchronization schemes;

DETAILED DESCRIPTION

Figure 1A:
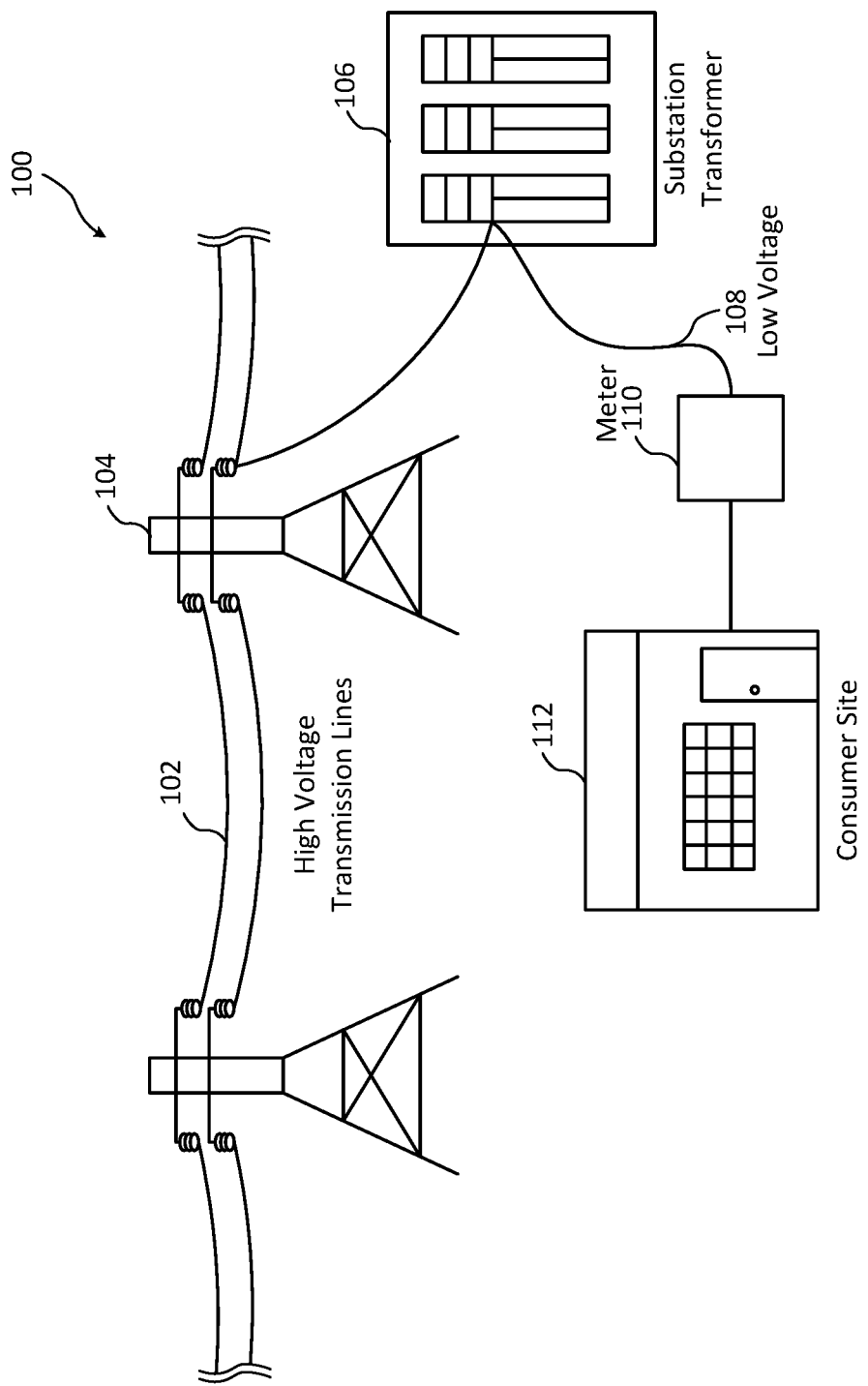
FIG. 1A shows an example electrical power grid in which the present disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular communication protocols like TDMA (Time Division Multiple Access), it will be appreciated that the disclosure may be used with other protocols such as FDMA (Frequency Division Multiple Access) OFDMA (Orthogonal Frequency Division Multiple Access) and CDMA (Code Division Multiple Access), and the like. Additionally, even though the present disclosure references power meters, it will be appreciated that the disclosure may be used with other applications, such as street lights, and other devices suitable for communication as Internet of Things.

Briefly described, a device and a method are disclosed including a PLC node having a synchronizer, a modem (modulator-demodulator) with a transceiver, and an optional computing device coupled with a power line to enable data communications between multiple PLC nodes through the power line using various communication protocols. In various embodiments, a special type of PLC node may be employed to act as a coordinator or Data Concentrator Unit (DCU) that coordinates the communication of PLC nodes. The PLC nodes are configured to detect a zero crossing of the power line wave form and transmit or receive data within time slots defined with respect to the detected zero crossing. In other embodiments, the time slots may be synchronized using a frame sync signal, an external signal, or polling. In various embodiments, the time slots may be random access or assigned. In some embodiments, the modem and/or node may be placed in a sleep mode when not communicating to reduce power consumption and be awaken when an allocated time slot is approaching.

Conventional power line communication systems include one or more devices, such as modems, which are coupled to a power line system. The communication between the modems in the network is typically asynchronous. That is, the transmitters in the network would select a time slot based on a random access scheme such as Carrier Sense Multiple Access (CSMA) and start transmission in that time slot if no other modem has started their transmission on a prior time slot. In random access systems, there is no prior knowledge of which modem transmits in every time slot. As a result of random access, there is always a probability of data signal collision due to simultaneous access of the same medium, the power line, by different modems, which results in packet loss, retries, and inefficiencies in the network.

In a time-division based synchronous communication system, each time slot may be assigned to a specific modem, usually by a coordinator. The advantage of a synchronous system is that the packet loss due to multiple simultaneous accesses is reduced or eliminated. In addition, the modems can go to sleep mode when the communication is idle and wake up around the time the modem is scheduled to transmit or receiver, yielding significant power savings.

PLC includes a number of standards, each focusing on a different area of communication performance. These standards include S-FSK (Spread Frequency Shift Keying), PRIME, G3, IEEE P1901.2, and others, which are applicable to the Physical layer, Data Link layer, and Network layer of the 7-layer data communication stack, as defined by ISO (International Standards Organization). The seven layers include physical, Data Link, Network, Transport, Session, Presentation, and Application layers. The upper layers of the communication stack, such as transport layer, may use other higher layer protocols such IPv4 and IPv6. In the diverse environments in which PLC may be used different kinds of communication interference are encountered. Therefore, innovations which reduce such interferences are highly desirable. For example, Orthogonal Frequency-Division Multiplexing (OFDM) modulation is suitable to provide high resiliency to interference and attenuation and is used in the G3 standard.

FIG. 1A shows an example electrical power grid in which the present disclosure may be practiced. In various embodiments, electrical power grid includes high voltage transmission lines 102, transmission towers 104, substation transformer 106, low voltage lines 108, electrical utility meter 110 and consumer site 112.

The electrical power grid is primarily employed to deliver electrical power to various buildings, factories, homes, businesses, and the like. However, the same transmission lines that are used to deliver electrical power may also be used as data communications mediums with suitable devices that can interface with the power lines. The transmission lines may also provide a hostile environment for low voltage data communications due to static charges created by air movement, thunderstorms, solar radiation, thermal fluctuations, inductive loads, and other environmental and non-environmental factors. As such, robust protocols are needed to reduce or minimize the effects of such interferences on the integrity of data communications. Hence, synchronous communications, which minimize data packet collisions encountered in asynchronous communications, may be preferable techniques.

Synchronization needs a synchronizing indicator such as a clock signal, a detectable event, or other globally visible indication, which may be detected by all relevant communication nodes. In power transmission, electrical power is transmitted as Alternating Current (AC). When used as a prefix, "AC" generally indicates a time-varying electrical quantity such as current or voltage. Due to the methods of generation of such electrical quantities by rotating machinery such as generators, the time-varying quantity is usually varies as a sinusoidal function. Such functions have a zero crossing, with respect to a ground voltage level, when crossing from a negative value to a positive value and vice versa. This zero crossing may be used as a synchronizing signal internal to the power transmission line that is globally visible to all coupled devices, precluding the need for an external synchronization signal.

Figure 1B:
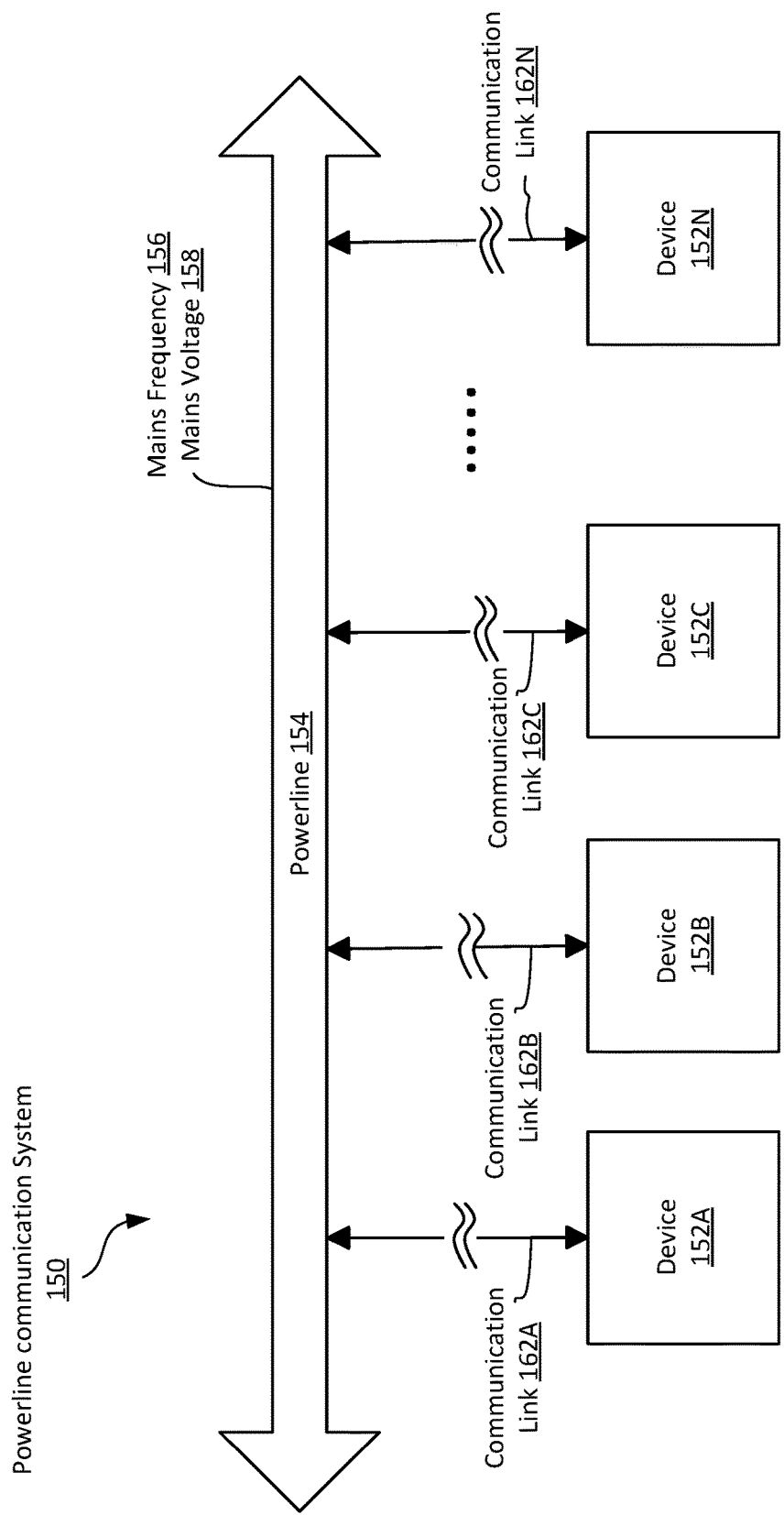
FIG. 1B shows an example Power Line Communication (PLC) arrangement, which may be a part of the example electrical grid of FIG. 1, having a power line coupled with multiple communication devices.

FIG. 1B shows an example Power Line Communication (PLC) arrangement, which may be a part of the example electrical grid of FIG. 1, having a power line coupled with multiple communication devices. In various embodiments, PLC system 150 includes power line 154 carrying AC current with a mains frequency 156 and a mains voltage 158. Multiple communication devices 152A-152N may be coupled with the power line 154 via communication links 162A-162N, respectively.

The frequency generated by an electrical generator is typically 50 or 60 HZ (cycles per second) that determines the mains frequency at the same value, while the mains voltage may have different values depending on the size of the transmission line and how major it is, which can range from hundreds of thousands of volts or more to a few hundred volts.

In various embodiments, the devices 152A-152N may include modems, which can send and receive data from the power line 154 and send for processing to a host computer, as discussed later with respect to FIG. 2B. A PLC node may be configured as a Data Concentrator Unit (DCU) or coordinator, which may also be coupled with the power line 154 to set up and coordinate communication activities between the multiple devices 152A-152N. A typical modem is an electronic device configured to modulate analog signals to encode digital data for transmission and demodulate analog signals to decode the transmitted data. The data communicated between the power line devices or nodes may include command and status data. For example, in power meter reading applications status data pertaining to amount of power consumption, voltage, current, average values, highest and lowest values within a specified time period, and various other parameters and statistics may be communicated back and forth. Commands may include setting threshold limits, defining assigned time slots, specifying communication protocols and/or parameters, and the like.

In various embodiments, communication links 162A-N may be implemented in several ways. In one embodiment, one or more of the communication links 162A-N may be ports or taps to couple respective devices 152A-N to power line 154. In other embodiments, one or more of the communication links may be configured as a net, wire, pilot cable, twisted pair, coaxial link, etc. Any suitable implementation or combination thereof may be adopted for the communication links 162A-N in illustrative embodiments.

In various embodiments, the communications between the DCU and various nodes or between the nodes themselves may be direct or indirect. In direct communications, data from one node is directed to another node in one network hop in which no intermediate node routes the data from source to destination. In indirect communications, data from a source node is first received by one or more intermediate nodes and then routed towards the destination node. Those skilled in the art will appreciate that a PLC system may have characteristics and structures similar to a computer network, such as the Internet, including gateways, subnets, routers, and multiple protocols each suitable for a different application or environment. In these PLC networked environments, various protocols may be used for discovery and data routing such as mesh routing.

Figure 2A:
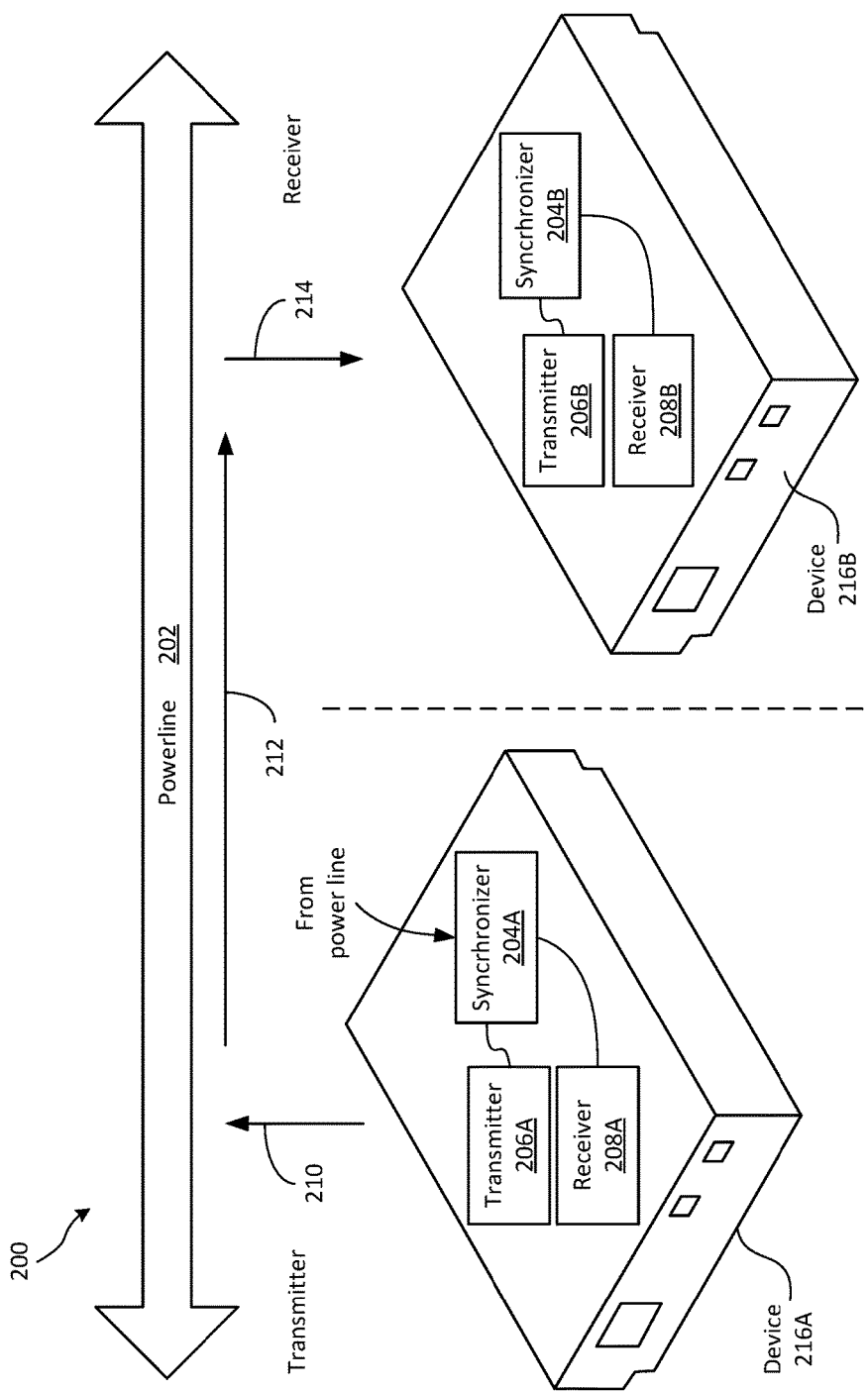
FIG. 2A shows an example segment of the example PLC arrangement of FIG. 1, including a transmitting and a receiving communication device coupled via the power line.

FIG. 2A shows an example segment of the example PLC arrangement of FIG. 1, including a transmitting and a receiving communication device coupled via the power line. In various embodiments, communication arrangement 200 includes a segment of a power line 202 coupled with a transmitting device 216A and a receiving device 216B. Each communication device 216A and 216B may be similar in structure and have synchronizers 204A and 204B, transmitters 206A and 206B, and receivers 208A and 208B, respectively. Communication data flow is indicated by arrows 210, 212, and 214, respectively originating from the transmitting device 216A and ending at the receiving device 216B.

In various embodiments, communication devices 216A and 216B may be both receivers and transmitters of data. These devices may be implemented as a PLC modem (modulator-demodulator) to modulate a carrier communication signal according to a predetermined data encoding scheme, such as OFDM, using various modulation techniques such as Quadrature Amplitude Modulation (QAM), Phase-Shift-Keying (PSK), or Differential PSK (DPSK).

In various embodiments, the synchronizer is directly connected to the power line and is configured to detect a synchronizing event or sync signal, such as a zero crossing of an AC current or voltage, or any other predetermined point on the waveform such as a maximum or minimum point, an external clock signal, or other indicator. In various embodiments, the synchronizer may be implemented as hardware, software, or a combination thereof. The synchronizer may further include both digital and analog electrical circuits to detect the synchronizing events.

In various embodiments, in operation, the synchronizer detects or generates the sync signal and provides an indication to be used by the transmitter and/or receiver to start transmission and/or receipt of data. In some embodiments, time slots are assigned to each communication device 216A and 216B by the DCU after an initial discovery session during which each communication device sends or responds to discovery communication packets to make its presence on the PLC network known. After the time slot is assigned to each communication device, the devices communicate during their respective allotted time slots. In various embodiments, random time slots may be available to use by the devices during the discovery period, during normal communications, or both.

Figure 2B:
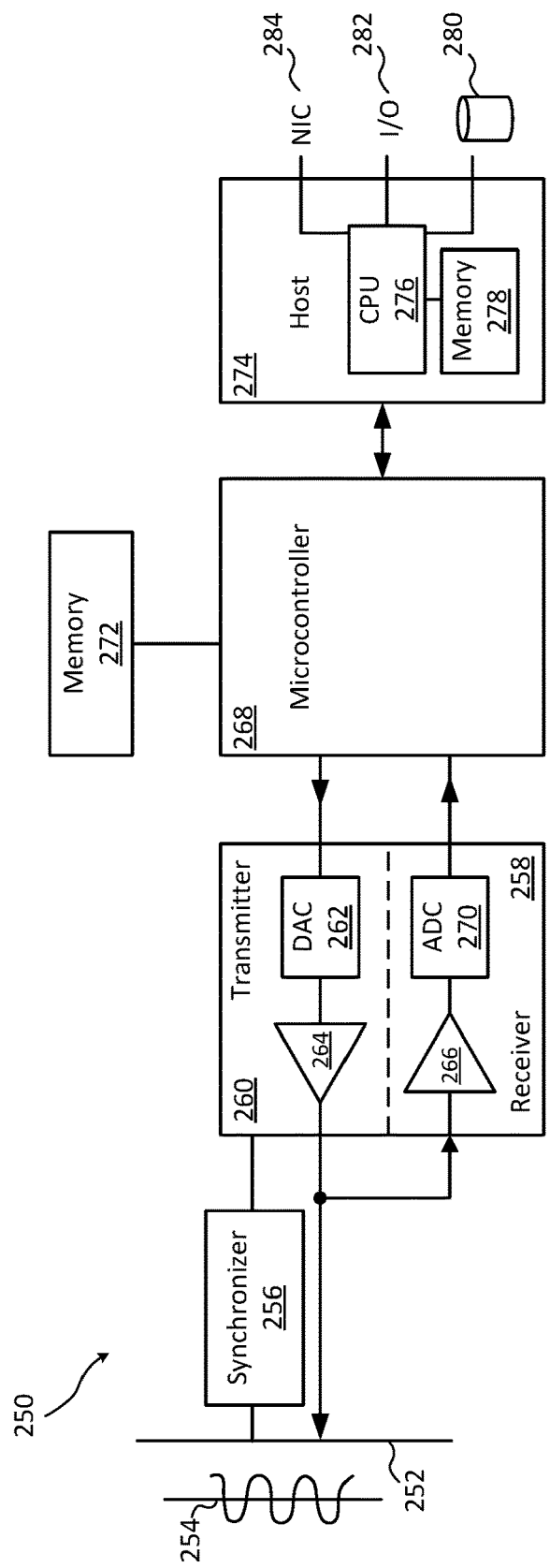
FIG. 2B shows an example PLC node including a synchronizer, a transceiver, a microcontroller, and a host computing device.

FIG. 2B shows an example PLC node including a synchronizer, a transceiver, a microcontroller, and a host computing device. In various embodiments, PLC node 250 may include a synchronizer 256 coupled with a power line 252 carrying AC current or voltage 254, a transceiver module having a transmitter 260 with Digital to Analog Converter (DAC) 262 and other circuitry 264, and a receiver 258 having various circuitry 266. The PLC node may further include or be coupled with a computing device such as a microcontroller 268 with Analog to Digital Converter (ADC) 270 and memory 272. The PLC and/or the microcontroller may include or be further coupled with a host computing device 274 having a Central Processing Unit (CPU), a memory module 278, a mass storage unit 280, an Input/Output (I/O) module 282, and a Network Interface Card (NIC) 284.

In various embodiments, microcontroller 268 with other firmware and/or hardware may implement the functionality of a modem as part of node 250. In some embodiments, the PLC node 250 itself may be a simple PLC modem used for data transmission and receiving, while in other embodiments, it may be a more functional unit with software-controlled computational power, or dedicated hardware, to perform data processing and communication functions. In various embodiments, For example, the PLC node may implement various communication protocols such as discovery, data encoding, data encryption, data storage, communication with non-PLC nodes on wired and wireless computer networks apart from the PLC network, and the like. Under software control, the PLC node may also perform various PLC tasks such as performing discovery functions, synchronous communications, PLC network data routing, idling mode control for power savings, wake-up controls for transmission after sync signal is detected, and the like.

The microcontroller 268 or host computing device 274 may include less or more than all the components shown in FIG. 2B depending on the functionality needed. Those skilled in the art will appreciate that the scope of integration of components of computing devices 268 and 274 may be different from what is shown. As such, some of the components of these computing devices may be integrated together as one unit. For example, I/O module 282 and NIC 284 may be implemented as an integrated unit. Additionally, different functions of a single component may be separated and implemented across several components instead. For example, different functions of I/O module, such as display or input devices, may be separated into two or more processing units.

In various embodiments, the PLC communication device 250 may include other hardware not shown, such as Global Positioning System (GPS) for the identification and tracking of its physical location. The communication device 250 may further include an illuminator (for example, LED indicator lights), graphic interface, and portable storage media such as USB drives. It may also include other processing units, such as a math co-processor, graphics processor/accelerator, and a Digital Signal Processor (DSP).

Memory modules 272 and 278 may be volatile (RAM—Random Access Memory) or non-volatile (ROM—Read Only Memory), include software such as Operating System (OS), and a variety of software application programs and/or software modules/components. Various data may also be stored in these memory modules. Such software modules and components may be stand-alone application software or be components, such as DLL (Dynamic Link Library) of a bigger application software. The microcontroller or the CPU 276 may be the main processor for software program execution in device 250. The CPU may represent one or more processing units that obtain software instructions from memory module and execute such instructions to carry out computations and/or transfer data between various sources and destinations of data, such as hard disk, I/O processor, display interface, input devices, non-volatile memory, and the like.

Figure 3:
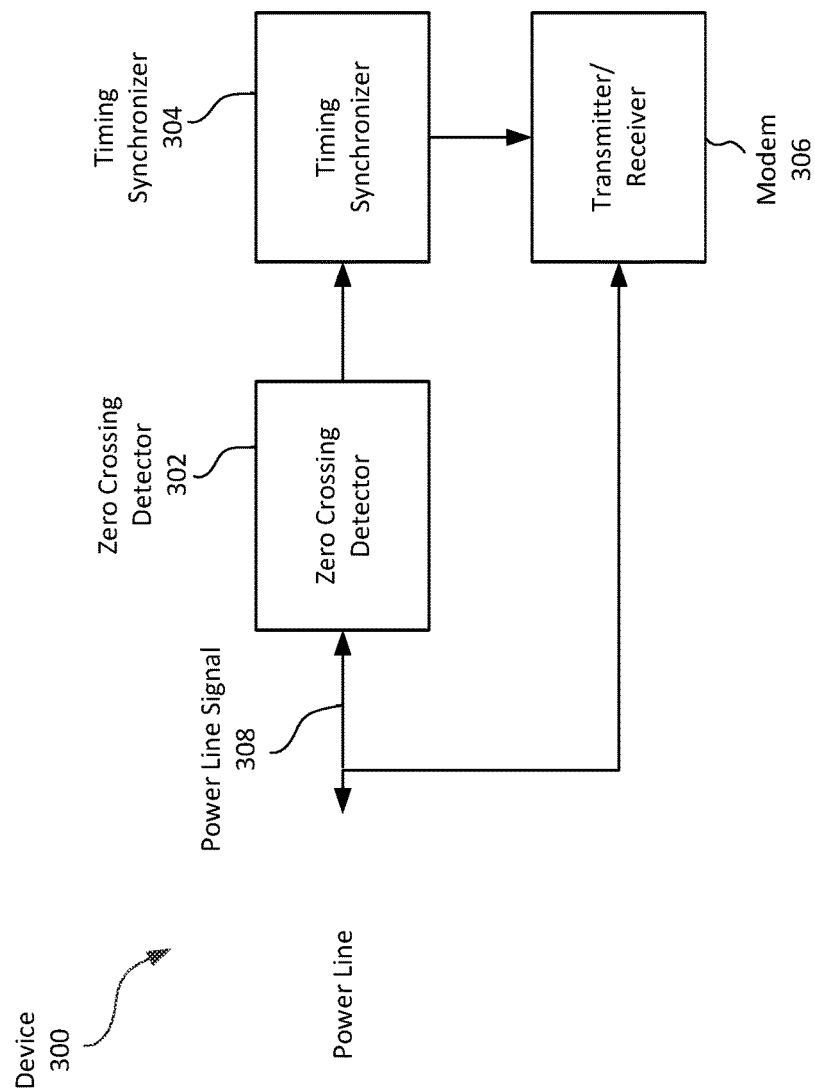
FIG. 3 shows an example block diagram of a timing synchronizer usable in a PLC.

FIG. 3 shows an example block diagram of a timing synchronizer usable in a PLC. In various embodiments, PLC communication device 300 includes a zero crossing detector 302 configured to receive power line signal 308 on one side and coupled to timing synchronizer module 304 at the other side. The timing synchronizer module 304 is in turn coupled with the transceiver module or modem 306.

In various embodiments, device 300 is configured to detect specific points on a power line wave form, such as zero crossings, minima, or maxima of the power line, and to synchronize the communication with such specific points of the power line waveform. These specific waveform points, such as the zero-crossing events act like embedded clock signals in the PLC system, which is visible to all PLC nodes connected to the power line. Using zero-crossing may remove the need of other external synchronization techniques, such as additional clock signals or frame sync signals, discussed below with respect to FIG. 4. Zero-crossing of the power line is detected by the zero-crossing detector 302, which may be coupled to the timing synchronizer module 304. The timing synchronizer is configured to provide communication timing to the receiver and transmitter in the modem 306.

In various embodiments, zero-crossing detector module 302 may be implemented using analog and digital hardware, software, or a combination thereof. For example, it may include software control and memory to store zero crossing values, margins, delays, acceptable fluctuation thresholds, hysteresis parameters, and other parameters, which may be useful in reliably detecting and characterizing zero crossing of a waveform.

In various embodiments, the timing synchronizer module 304 may be implemented using hardware, software, or a combination thereof. The timing synchronizer may use zero crossing information obtained from the zero-crossing detector 302 to provide further timing information to the modem 306. For example, the timing synchronizer module may use the zero-crossing information to define and communicate time slot boundaries for transmission of data.

In various embodiments, modem 306 is used to modulate one or more communication carrier or subcarriers, such as those used with OFDM encoding scheme, to transmit data or receive data and demodulate for use by other computing devices as part of the PLC node or coupled with the PLC node.

Figure 4:
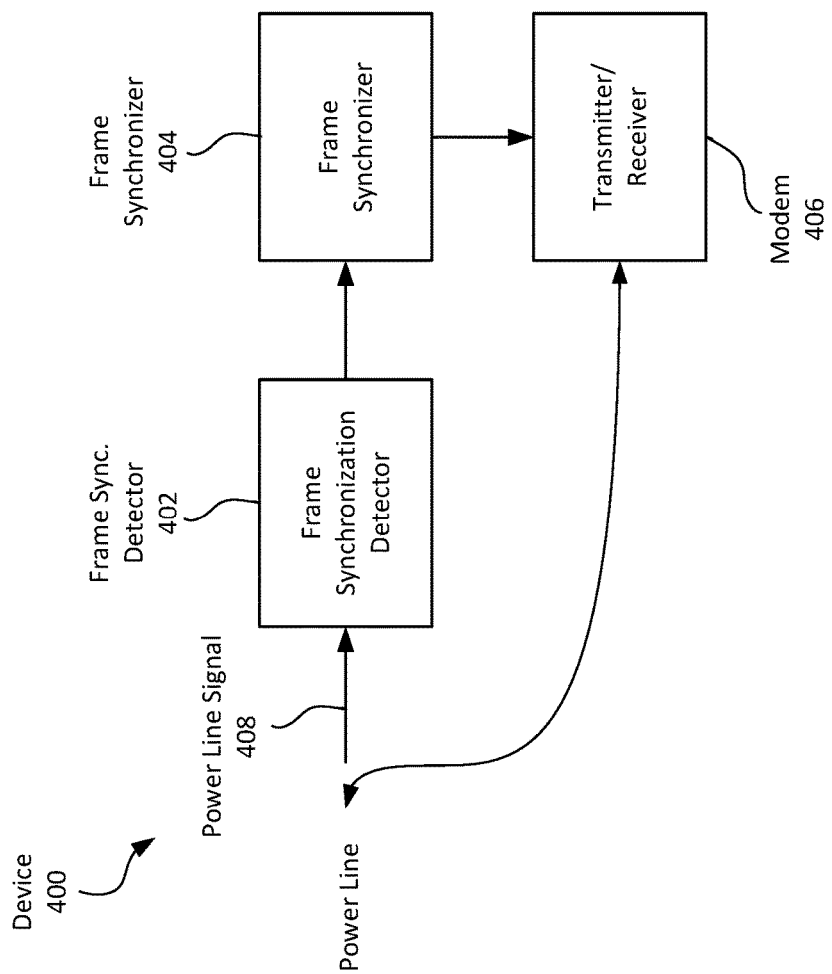
FIG. 4 shows an example frame synchronizer usable in a PLC.

FIG. 4 shows an example frame synchronizer usable in a PLC. In various embodiments, PLC communication device 400 includes frame synchronization detector 402 configured to receive power line signal 408 on one side and coupled to frame synchronizer module 404 at the other side. The frame synchronizer module 404 is in turn coupled with the transceiver module or modem 406.

In various embodiments, device 400 is similar to device 300 of FIG. 3, but instead of synchronizing with zero crossing, it is configured to synchronize transmit and receive signals with a frame synchronization signal. Frame sync detector 402 may be connected to the power line to search for the frame synchronization signal. The frame synchronization signals may be provided to frame synchronizer module 404, which provides the timing for the modem 406. Modem 406 may include or be configured as a modem, such as devices 216A or 216B of FIG. 2A.

Moreover, in some embodiments, frame synchronization may be aligned with the zero crossings of the power line signal. In an alternative embodiment, frame synchronization may be independent of the power line zero crossings. Alternative configurations and suitable variations of synchronization can be recognized by one skilled in the art without departing from the spirit of the present disclosure.

A frame is generally a predefined information packet, which may include a preamble signal or bit pattern to be recognized as the beginning of the frame; timing information; header area with various data and bit fields; meta data such as frame size, origin, address, destination, and the like. Those skilled in the art will appreciate that a data packet or frame is predefined in the specification of each communication protocol. A frame or packet is useful as an electronic container of serial information. A data packet may be constructed according to the frame specification and then transmitted in ordered sequence, bit by bit, or byte by byte, onto the transmission medium. Similarly, once a data packet is received at a receiver, it is unpacked and decoded in accordance with the frame specification and in the order received, or as identified by its header information, to access the data payload.

Figure 5B:
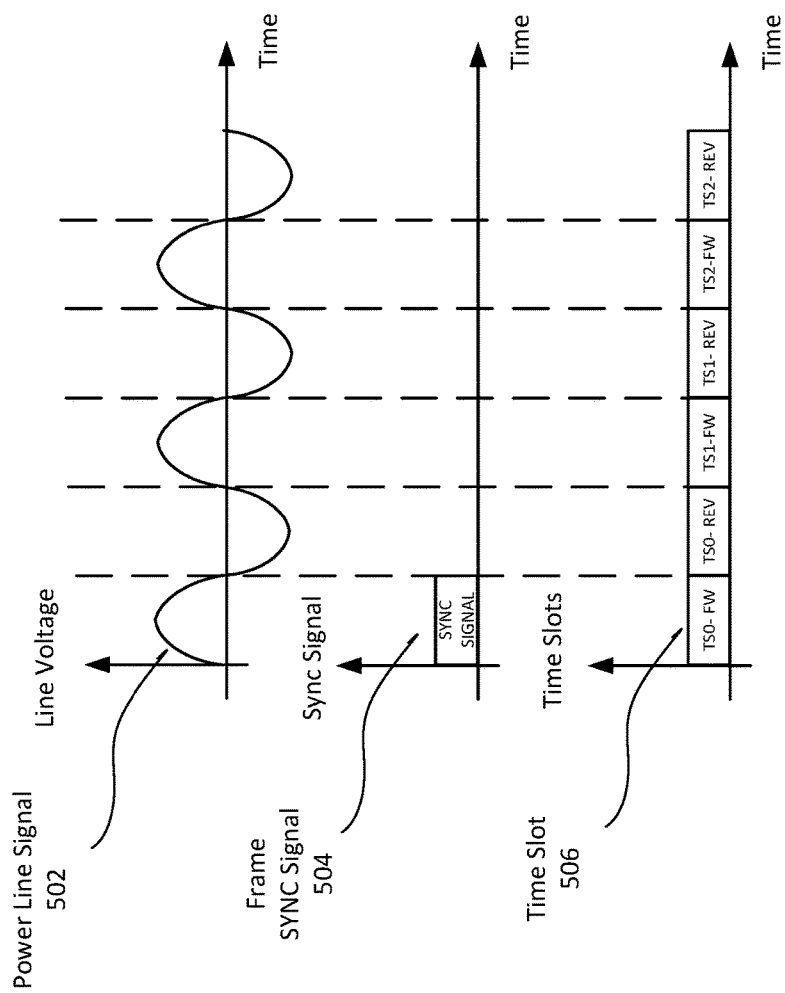

FIGS. 5A-5C show various examples of timing diagrams for various synchronization schemes. In various embodiments, FIG. 5A, shows power line signal 502 representing an AC current or voltage, frame sync signal (synchronization signal) 504 identifying the beginning of a data frame coincident with a zero crossing of power line signal 502, and time slots 506 defined with respect to and coincident with the frame sync signal. The time slots include multiple time frames TS0, TS1, TS2, etc.

In various embodiments, the time slots TS0, TS1, etc. in a multiple access frame may be synchronized with the zero crossings of the power line. The duration of each time slot may be limited to one complete cycle of the power line signal. In an alternative embodiment the time slots may be limited to half cycle of the power line signal. Yet, in another embodiment each time slot may cover integer multiple and a fractional cycle of the power line signal. Moreover, a super frame including multiple frames or longer than normal frames may be superimposed on multiple time slots. The DCU may transmit a sync signal at the beginning of the frame or super frame so that each communication node in the PLC system can follow the frame or super frame timing and know when the frame or super frame starts and for how many time slots it continues.

In various embodiments, in operation, the DCU may detect the zero crossings of a power line AC quantity (current or voltage waveform) and start transmitting the sync signal to mark the beginning of a new data frame. In other embodiments, the sync signal may be transmitted at some point of time within the power line cycle, independently of its zero crossing. The sync signal also defines the starting point of the first time slot TS0, followed by other time slots TS1, TS2, etc. at regular time intervals thereafter. A fixed or variable number of time slots, as may be specified in a data frame header fields, define a data frame used by the PLC nodes to transmit or receive data from the PLC power line.

Once the sync signal indicates the start of the time slots and data frame, each PLC node can detect the sync signal and therefore the time of transmission for time slot T0, and thus, the time of subsequent time slots. This way each PLC node may transmit or receive data in its own designated time slot. Each PLC may place itself in a low-activity idle mode during other time slots which are not assigned to it.

In various embodiments, in an initial state of communications, a discovery protocol may be executed to discover new PLC nodes joining, rejoining, or otherwise beginning to participate in the PLC network. For example, an initial state may be entered when a new PLC node is added to the system, when there is a system reset, after an error recovery, after node hardware or software upgrade, after a security breach, after natural disaster taking down power lines, after repair of a hardware failure, and the like. During a discovery period, new PLC nodes may send a discovery packet out on the PLC node to discover the DCU and/or other PLC nodes. Once the DCU discovers a new PLC node, it may assign a new time slot to the new PLC node for future communications.

In various embodiments, during a steady state communication period when PLC nodes have been assigned their own respective time slots, a PLC node that is in idle or sleep mode may detect a frame sync signal or other indication of the start of a new set of time slots. Data frames may then be transmitted by respective PLC nodes, each during its own assigned time slot. The PLC node may start counting the time slots after the sync signal until its own time slot arrives. At this time, the PLC node may wake up and start transmitting data in the form of one or more data frames, if any, during its own time slot. Afterwards, it can go back to idle mode.

Now with reference to FIG. 5B, in various embodiments, time slots 506 may be synchronized with zero crossings of the power line signal 502. In some embodiments, different time slots may be assigned to different directions of communication, such as for transmission or for receiving data. For example, one direction of data transmission may be from the DCU to a PLC node (forward) during TS0-FW time slot, and another direction may be from the PLC node to the DCU (reverse) during TS0-REV time slot. Similarly, different directions of data transmission may be employed during other forward time slots TS1-FW and TS2-FW, and during other reverse time slots TS1-REV and TS2-REV.

Now with reference to FIG. 5C, in various embodiments time slots 506 including individual time slots TS0, TS1, etc., may cover more or less than a cycle of the power line signal 502. Time slots may also cover an integral one or multiple of power line signal full cycles or half cycles. In other embodiments, the time slots may cover a fractional part of power line signal cycle. In various embodiments, different time slots, regardless of size, may be assigned to different communication directions, forward and reverse, as described with respect to FIG. 5B.

Figure 6A:
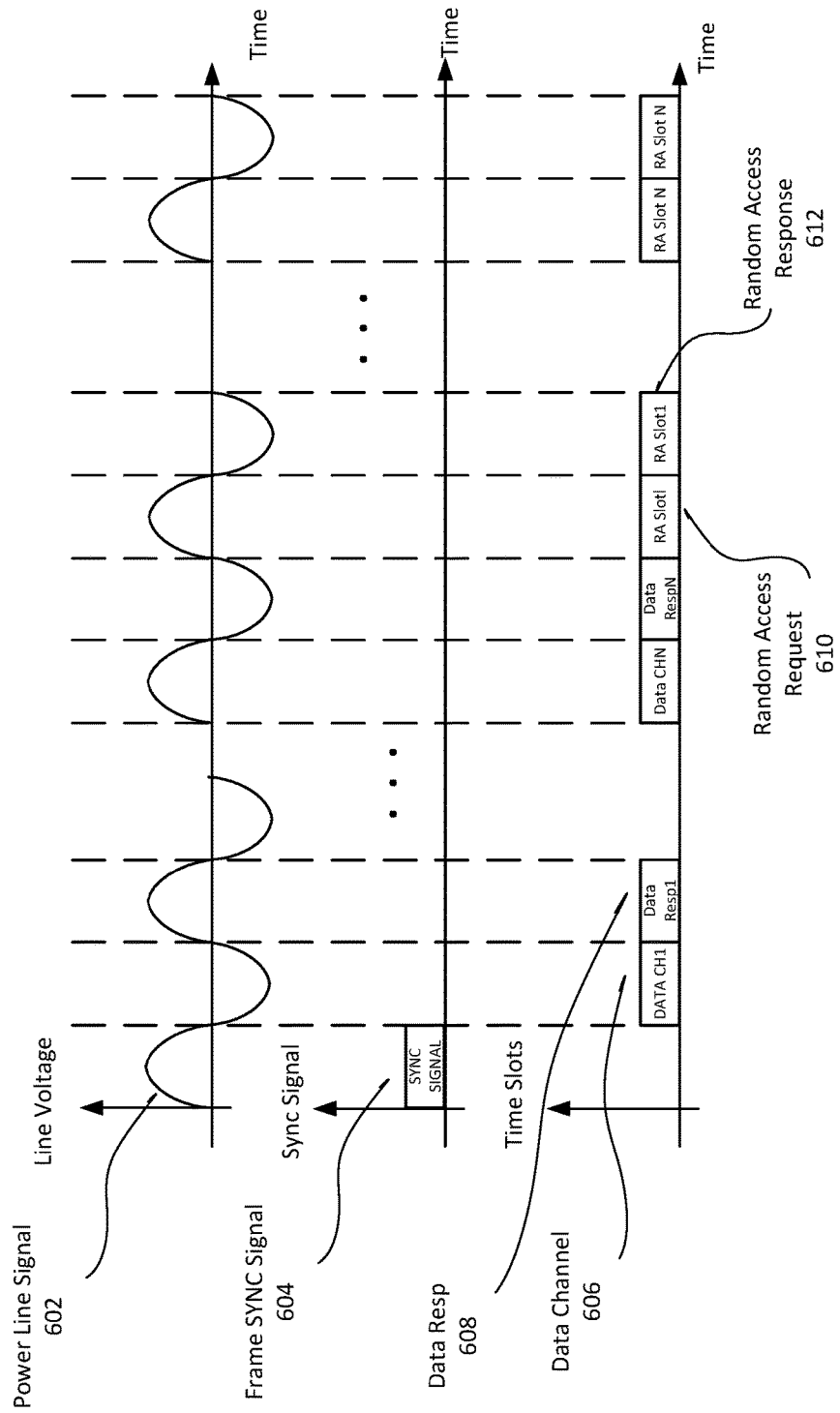
FIGS. 6A and 6B show various example frame structures for various synchronization schemes.
Figure 6B:
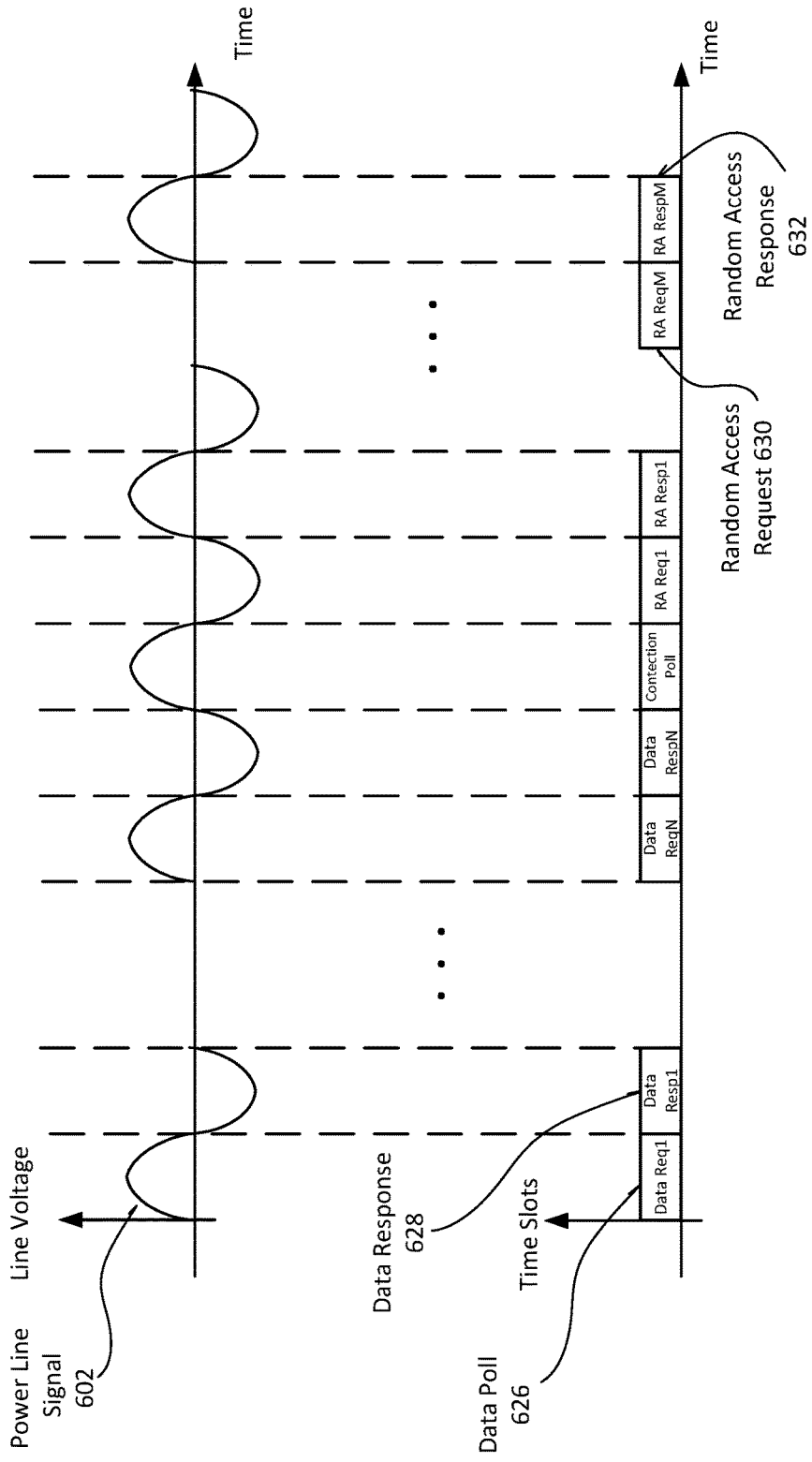

FIGS. 6A and 6B show various example frame structures for various synchronization schemes. In various embodiments, power line signal (AC current or voltage) 602 includes sinusoidal wave forms over time. Frame sync signal 604 may be generated by the DCU coincident with a zero-crossing point on the power line signal 602, or independently of the zero-crossing point. Time slots may include several types based on function or use including a data channel 606 for data transmission, a data response slot 608 for response to the data transmission received from channel 606, a Random Access Request time slot 610, and a Random Access Response time slot 612 for response to Random Access Request time slot 610.

With reference to FIG. 6A, in various embodiments, a Multiple Access frame structure is shown defined in terms of the time slots 606 and 608. Multiple Access frame may include different time slots for data transmission and for random access. Each data transmission time slot may be assigned to a specific PLC node to transmit its data or to receive data from the DCU or other nodes. The PLC nodes may join the network through a discovery or registration process using a random access scheme. A number of Random Access (RA) channels may be available in a PLC system for use during discovery and also during steady state communications. In various embodiments, each PLC node, before joining the PLC network, may select a RA time slot and transmit a request message or packet to join the network to the DCU. The PLC node may include a signature associated with itself in the request message. The signature may be, but not limited to, a device serial number or a MAC (Media Access Control) address, a GUID (Globally Unique ID), a randomly picked number, a combination thereof, or any other unique identifier of the PLC node suitable for use in the PLC network. If no other node randomly selects the same RA channel and the transmission is successful, the DCU may send a response message with the device signature being embedded in a response time slot associated with the random access time slot.

For example, with continued reference to FIG. 6A, a frame sync signal 604 is transmitted by the DCU that indicates the start of the frame. Each node transmits or receives data in the data slot 606 (DATA CH1) and receives or transmits a response to a data transmission in the response slot 608 (data Resp1). The PLC nodes that have not yet joined the network may send their request in a randomly picked random access request time slot 610 and get their response in the random access response time slot 612. In one embodiment, a frame format or communication time slots may include, in order, the data time slots and the corresponding response time slots follow the frame sync signal, and then followed by random access time slots and corresponding random access response time slots. In another embodiment, the data time slots may follow the random access slots. In general, any predetermined ordering of the data time slots, random access time slots and their associated response time slots may be predefined to specify the frame format.

Now with reference to FIG. 6B, in an alternative embodiment, instead of using a frame sync signal to synchronize communications, the DCU may send a data poll time slot 626 to poll a specific PLC node corresponding to each time slot. The data poll slot time 626 may include the PLC node network address and/or its signature. The addressed PLC node may send its data or response in data response time slot 628. In addition, the PLC nodes that have not joined the network may send their request in a randomly picked random access request time slot 630 and get their response in the random access response time slot 632. In one embodiment, the data poll time slots and the response time slots are followed by random access time slots and random access response time slots. In another embodiment, data time slots may follow the random access slots. In general, any predetermined ordering of the data time slots, random access time slots and their associated response time slots may be predefined to specify the frame format.

With reference to FIGS. 6A and 6B, time slots in a multiple access frame are shown to be synchronized with the zero crossings of the power line. The duration of time slots may be limited to one complete cycle of the power line signal. In an alternative embodiment the time slots may be limited to half cycle of the power line signal. Yet, in another embodiment each time slot may cover an integer multiple and/or fractional cycles of the power line signal. Furthermore, in an alternative embodiment time slots may follow a timing that may be independent of the zero crossings of the power line signal. In this case, synchronization may be achieved by other means such as, but not limited to, a frame synchronization signal, clock signals, or other extra timing tracking signals.

Figure 7:
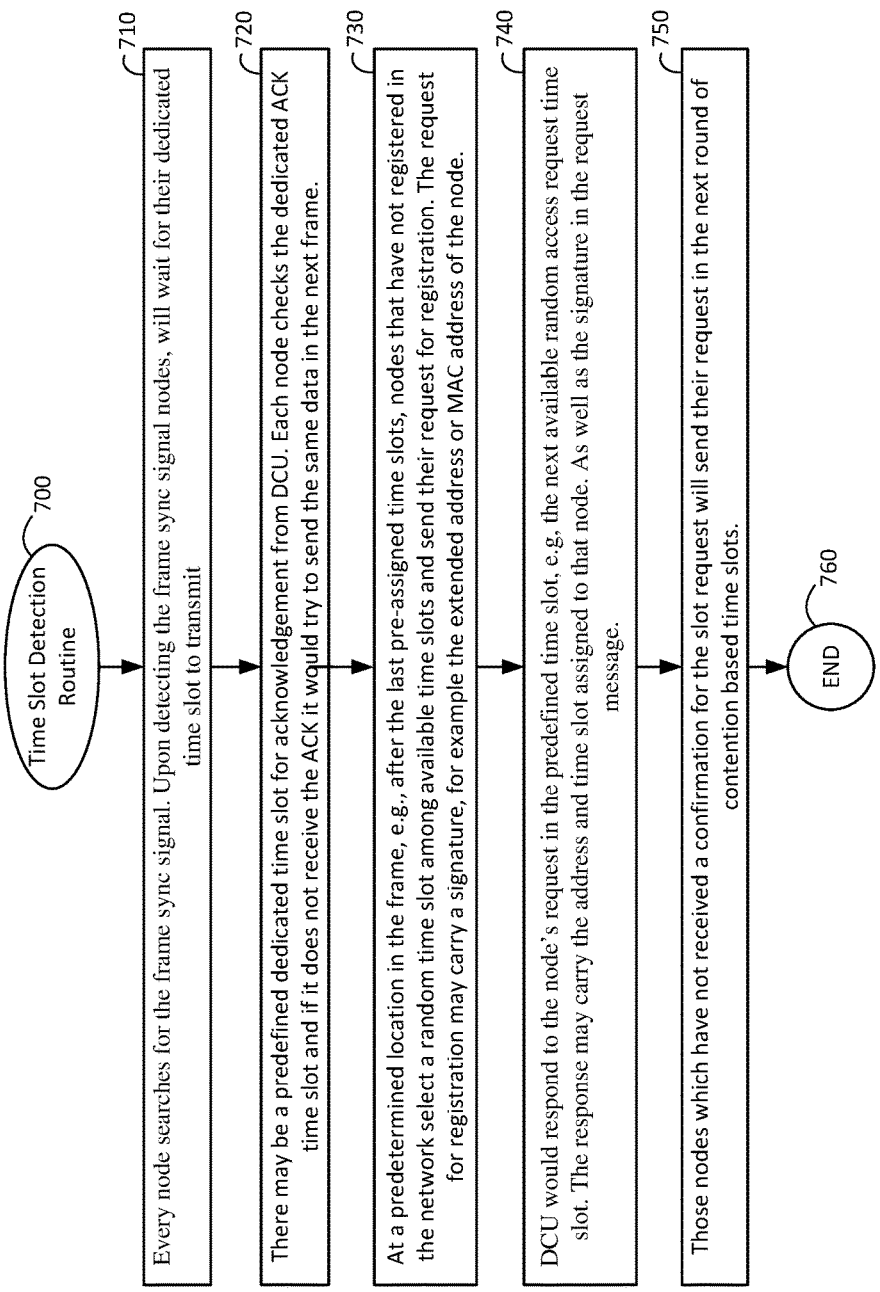
FIG. 7 is a flow diagram for an example routine of time slot allocation in a slotted communication system.

FIG. 7 is a flow diagram for an example routine of time slot allocation in a slotted communication system. In various embodiments, time slot detection routine starts at block 700 and continues to block 710.

At block 710, every PLC node searches for the frame sync signal send by the DCU. Upon detecting the frame sync signal, the PLC node waits for its dedicated or assigned time slot to transmit. The routine proceeds to block 720.

At block 720, in various embodiments, a time slot may be defined for receiving acknowledgement (ACK) by the DCU in response to data received from a PLC node. If a PLC node does not receive an ACK from the DCU, it may retry sending its previous data in its time slot in the next set of time slots. The routine proceeds to block 730.

At block 730, PLC nodes that have not yet registered with the PLC and have not received a dedicated time slot may use a predefined Random Access time slot to transmit their request for registration. The request message may include a PLC node signature, ID, MAC address, or other identifying parameters to uniquely identify the PLC node to the DCU. The routine proceeds to block 740.

At block 740, the DCU may respond to the PLC node's request (from block 730) for registration by including the response in a predefined time slot, such as the next available random access request time slot. Such response may include the PLC node's signature or ID and the time slot identifier (for example, a reference or sequence number with respect to the beginning of the set of time slots) assigned to the requesting PLC node. The routine proceeds to block 750.

At block 750, the PLC nodes that have not yet received a confirmation and/or slot assignment for their time slot request, may send their request in the next frame using random access (contention based, with possibility of network packet collision) time slots. The routine proceeds to block 760.

The routine terminates at block 760.

Figure 8:
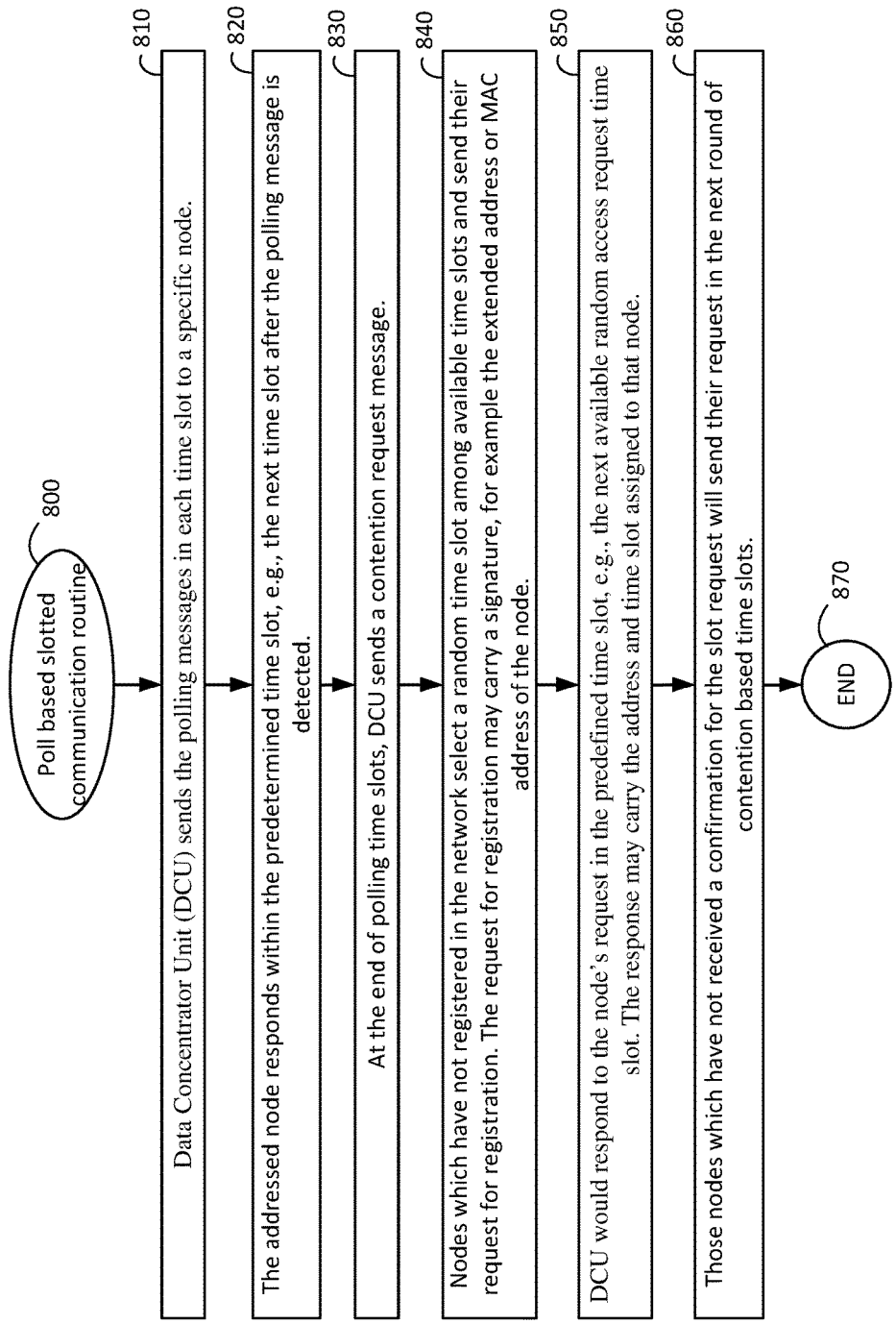
FIG. 8 is a flow diagram for an example routine of poll-based communication in a slotted communication system.

FIG. 8 is a flow diagram for an example routine of poll-based communication in a slotted communication system. In various embodiments, time slot detection routine starts at block 800 and continues to block 810.

At block 810, the DCU sends a polling message in each time slot associated with a registered specific PLC node. The routine proceeds to block 820.

At block 820, the polled PLC node responds within a predetermined time slot, such as the next time slot after the polling message is detected. In effect, the polling message performs the function of defining the beginning of a data frame or time slot for each PLC node, instead of using a sync frame or a zero crossing of the power line wave form. The routine moves to block 830.

At block 830, when the DCU has issued polling messages to all the assigned time slots associated with registered PLC nodes, it sends a contention request message for the non-registered PLC nodes. The routine proceeds to block 840.

At block 840, the unregistered PLC nodes may select an available random access time slot to send their registration request. The request for registration may include other information such as a unique identifier for the PLC node (for example, MAC address, signature, etc.) to identify itself to the DCU. The routine proceeds to block 850.

At block 850, the DCU may respond to the request from block 840 within a predefined time slot, such as the next random access request time slot. The response may include the node's signature or other identifier to identify the node to which the response is addressed. The routine proceeds to block 860.

At block 860, the PLC nodes that have not yet received a confirmation and/or slot assignment for their time slot request, may send their request in the next frame using random access (contention based, with possibility of network packet collision) time slots. The routine proceeds to block 870.

The routine terminates at block 870.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the disclosure.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems which perform the specified actions or steps, or combinations of special purpose hardware and computer instructions.

It will be further understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A Power Line Communication (PLC) system comprising:
a power line configured to carry AC current;
a Data Concentration Unit (DCU) configured to generate a data frame synchronization signal; and
a PLC node coupled with the power line and configured to detect the data frame synchronization signal and further configured to transmit data over the power line upon detection of the frame synchronization signal, wherein the DCU is configured to send a polling message to each of a plurality of PLC nodes to synchronize transmission by each of the plurality of PLC nodes.

2. The PLC system of claim 1, wherein the PLC node comprises a frame synchronization detector module, a modem, and a computing device.

3. The PLC system of claim 1, wherein the DCU is further configured to register a plurality of PLC nodes during a discovery period and assign a different time slot to each of the plurality of the PLC nodes.

4. The PLC system of claim 1, wherein the data frame synchronization signal marks the beginning of a plurality of time slots.

5. The PLC system of claim 1, wherein each PLC is configured to transmit data during one of a time slot assigned to the PLC and a random time slot.

6. A method of communicating data over a Power Line Communication (PLC) system, the method comprising:
detecting a data frame synchronization signal transmitted over a power line;
indicating the event of detection of the data frame synchronization signal to at least one Power Line Communication (PLC) node; and
transmitting data over the power line after receiving the indication of the event of detection of the data frame synchronization signal, wherein the data is transmitted over a plurality of data transfer cycles, each of which is longer than a period of the AC (Alternating Current) current, and wherein some of the plurality of the data transfer cycles are non-assigned random access and use timeslots, and further comprising transmitting an ID (Identification) or a signature by the at least one PLC node to a Data Concentrator Unit (DCU) during a discovery period.

7. The method of claim 6, further comprising detecting a timing event of the AC current wave-form including one of a zero-crossing, a maximum point, and a minimum point, and indicating the detection of the timing event to the at least one PLC node.

8. The method of claim 6, further comprising assigning a time slot by a Data Concentrator Unit (DCU) to the at least one PLC node to be used for data transmission by the at least one PLC node.

9. The method of claim 6, wherein the at least one PLC node is configured to use an assigned time slot or a random time slot to transmit data.

10. The method of claim 6, further comprising polling the at least one PLC node to synchronize data transmissions by the at least one PLC node.

* * * * *